(12) United States Patent
Boswell

(10) Patent No.: US 6,497,778 B1
(45) Date of Patent: Dec. 24, 2002

(54) METHOD FOR MAKING HOLOGRAPHIC FOIL

(75) Inventor: David R. Boswell, Reading (GB)

(73) Assignee: NovaVision, Inc., Bowling Green, OH (US)

(*) Notice: Subject to any disclaimer, the term of this patent is extended or adjusted under 35 U.S.C. 154(b) by 253 days.

(21) Appl. No.: 09/593,846

(22) Filed: Jun. 14, 2000

Related U.S. Application Data
(60) Provisional application No. 60/197,754, filed on Apr. 19, 2000.

(51) Int. Cl.$^7$ .................................................. B31F 1/07
(52) U.S. Cl. ..................... 156/209; 156/583.1; 156/555; 428/457; 428/484; 428/42.3; 359/1
(58) Field of Search ................................ 156/209, 239, 156/240–241, 230, 233, 235, 238, 157, 324, 297, 299, 580, 583.1, 555, 552, 553, 556; 428/195, 200, 209, 343, 346, 457, 458, 461–462, 464, 446, 467, 484, 500, 913, 401, 41.7–41.8, 42.1, 42.2, 42.3; 427/148, 404, 407.1, 208.2, 412.1; 264/284; 359/576, 1–35; 257/679; 361/737

(56) References Cited

U.S. PATENT DOCUMENTS

| | | | |
|---|---|---|---|
| 3,898,358 A | * | 8/1975 | Ryan et al. .................... 101/32 |
| 4,012,552 A | | 3/1977 | Watts |
| 4,225,211 A | | 9/1980 | Abe |
| 4,340,438 A | | 7/1982 | Davis |
| 4,357,395 A | | 11/1982 | Lifshin et al. |
| 4,378,141 A | | 3/1983 | Yevick |
| 4,477,312 A | | 10/1984 | Czichy |
| 4,495,232 A | | 1/1985 | Bauser et al. |
| 4,545,838 A | | 10/1985 | Minkus et al. |
| 4,603,937 A | | 8/1986 | Copp |
| 4,629,647 A | | 12/1986 | Sander |
| 4,631,222 A | | 12/1986 | Sander |
| 4,657,803 A | | 4/1987 | Pernicano |
| 4,701,235 A | | 10/1987 | Mitsam |
| 4,717,615 A | | 1/1988 | Reinhart |
| 4,725,111 A | | 2/1988 | Weitzen et al. |
| 4,728,377 A | | 3/1988 | Gallagher |
| 4,758,296 A | | 7/1988 | McGrew |
| 4,759,969 A | | 7/1988 | Sander |
| 4,773,718 A | | 9/1988 | Weitzen et al. |
| 4,778,262 A | | 10/1988 | Haines |
| 4,832,445 A | | 5/1989 | Haines et al. |
| 4,837,072 A | | 6/1989 | Kraetschmer |
| 4,856,857 A | | 8/1989 | Takeuchi et al. |
| 4,877,710 A | | 10/1989 | Ishikawa |
| 4,892,602 A | | 1/1990 | Oike et al. |
| 4,893,887 A | | 1/1990 | Coates |
| 4,900,111 A | | 2/1990 | D'Amato et al. |
| 4,908,285 A | | 3/1990 | Kushibiki et al. |
| 4,913,504 A | | 4/1990 | Gallagher |

(List continued on next page.)

FOREIGN PATENT DOCUMENTS

| | | |
|---|---|---|
| CA | 2046711 | 1/1992 |
| DE | 3744650 | 7/1989 |
| DE | 4006276 | 10/1990 |

(List continued on next page.)

*Primary Examiner*—Michael W. Ball
*Assistant Examiner*—Jessica Rossi
(74) *Attorney, Agent, or Firm*—Emch, Schaffer, Schaub & Porcello, Co., L.P.A.

(57) ABSTRACT

A composite sheet having the capability of having embossed therein a holographic image or diffraction grating image having a structure of multiple layers including a plastic film carrier, lacquer, metal and wax or siloxane. It may be adhered to a substrate by heating, pressing or stamping without the necessity of removing the plastic film carrier and may have a holographic image embossed therein during the step of heat pressing or stamping or in a separate operation at a different time.

16 Claims, 6 Drawing Sheets

U.S. PATENT DOCUMENTS

| | | |
|---|---|---|
| 4,913,858 A | 4/1990 | Miekka et al. |
| 4,921,319 A | 5/1990 | Mallik |
| 4,933,120 A | 6/1990 | D'Amato et al. |
| 4,969,700 A | 11/1990 | Haines |
| 4,971,646 A | 11/1990 | Schell et al. |
| 4,976,799 A | 12/1990 | Wood |
| 4,978,593 A | 12/1990 | Yin et al. |
| 4,990,415 A | 2/1991 | Yu |
| 4,994,131 A | 2/1991 | Edwards |
| 5,003,915 A | 4/1991 | D'Amato et al. |
| 5,011,707 A | 4/1991 | Schell et al. |
| 5,013,494 A | 5/1991 | Kubo et al. |
| 5,013,632 A | 5/1991 | Weber |
| 5,044,707 A | 9/1991 | Mallik |
| 5,053,260 A | 10/1991 | Brehm |
| 5,063,658 A | 11/1991 | Wild |
| 5,071,597 A | 12/1991 | D'Amato et al. |
| 5,083,850 A | 1/1992 | Mallik et al. |
| 5,085,514 A | 2/1992 | Mallik et al. |
| 5,087,510 A | 2/1992 | Tokas et al. |
| 5,116,548 A | 5/1992 | Mallik et al. |
| 5,128,779 A | 7/1992 | Mallik |
| 5,142,383 A | 8/1992 | Mallik |
| 5,145,212 A | 9/1992 | Mallik |
| 5,155,604 A | 10/1992 | Miekka et al. |
| 5,162,927 A | 11/1992 | Moss et al. |
| 5,164,227 A | 11/1992 | Miekka et al. |
| 5,172,250 A | 12/1992 | Tsuchiya et al. |
| 5,186,787 A | 2/1993 | Phillips et al. |
| 5,189,531 A | 2/1993 | Palmer et al. |
| 5,191,449 A | 3/1993 | Newswanger |
| 5,194,971 A | 3/1993 | Haines |
| 5,199,744 A | 4/1993 | Shenton |
| 5,300,169 A | 4/1994 | Tahara |
| 5,464,690 A | 11/1995 | Boswell |
| 5,756,183 A | 5/1998 | Kutsch et al. |
| 5,810,957 A | 9/1998 | Boswell |
| 5,889,598 A | 3/1999 | Monaghan |
| 5,913,543 A * | 6/1999 | Curiel ......................... 283/94 |
| 6,364,983 B1 * | 4/2002 | Kay ........................... 156/230 |

FOREIGN PATENT DOCUMENTS

| | | |
|---|---|---|
| EP | 145481 | 6/1985 |
| EP | 201323 | 11/1986 |
| EP | 420261 | 4/1991 |
| EP | 0 466 118 B1 | 1/1992 |
| EP | 0 945 280 A2 | 9/1999 |
| GB | 2220386 | 1/1990 |
| WO | WO 9108524 | 6/1991 |
| WO | WO 9316888 | 9/1993 |
| WO | WO 9324332 | 12/1993 |
| WO | WO 9400803 | 1/1994 |

* cited by examiner

METHOD FOR MAKING HOLOGRAPHIC FOIL

CROSS REFERENCE TO RELATED APPLICATION

This application is based upon and claims priority from the filing date of U.S. Provisional Application No. 60/197,754, filed Apr. 19, 2000.

DESCRIPTION

The present invention is directed to a new foil which may be applied to a substrate and thereafter have embossed thereon a holographic image or diffraction grating image.

BACKGROUND OF THE INVENTION

My prior U.S. Pat. No. 5,464,690 discloses a foil of a composite sheet suitable for having directly applied thereto a holographic image or diffraction grating image immediately following transfer of such composite sheet from a carrier film to a substrate to which such composite sheet is adhered. Under that invention, the composite sheet is releasably affixed to a carrier film of polyester, polypropylene or similar material and has an adhesive layer on the surface opposite the carrier film. The composite sheet of my prior invention may be transferred by heat stamping the combined composite sheet and carrier film against a substrate to which it is desired to have the composite sheet or a small portion thereof affixed. A heated die engages the carrier film urging the composite sheet into firm engagement with the substrate. Heat from the heated die causes the adhesive layer of the composite sheet to become activated and thereby adhesively engage the composite sheet to the substrate. The heated die also causes the composite sheet portion engaged by the heated die to separate from the carrier film thereby leaving a metal layer of such composite sheet exposed for engagement by a shim bearing a holographic image or diffraction grating image. The shim, carried by a second heated die, engages the metal layer directly; however, it is possible that there will be some residue of a wax if the composite sheet were provided with a wax release coating between the layer of metal and the carrier film. The shim bearing the holographic image or diffraction grating image embosses such image into the metal layer and the underlying lacquer layer of the composite sheet adhered to the substrate.

U.S. Pat. Nos. 5,674,580, 5,643,678 and 5,653,349 are directed to modifications to the invention disclosed in U.S. Pat. No. 5,464,690.

DISCLOSURE OF THE INVENTION

Under the present invention, there is provided a modified composite sheet having a construction permitting the direct application of such composite sheet to a substrate and, if desired, simultaneous embossing of a holographic image or diffraction grating image to such composite sheet engaged to the substrate without the necessity of removing a carrier film therefrom. The composite sheet and method of the present invention eliminate the step of transferring the composite sheet from a carrier film to the substrate as the composite sheet of the present invention does not require use of a releasable carrier film. The construction of the composite sheet of the present invention is such as to permit the embossing of a holographic image or diffraction grating image without the necessity of first separating the composite sheet from a carrier film. The composite sheet of the present invention is particularly advantageous for those situations in which it is desired to supply the composite sheet for interfacial engagement to the substrate in the form of a discrete sheet or section as opposed to being supplied from a roll. It can be provided in relatively large sizes, for example, on the order of 40 inches by 60 inches.

DETAILED DESCRIPTION OF THE INVENTION

Figure 1:
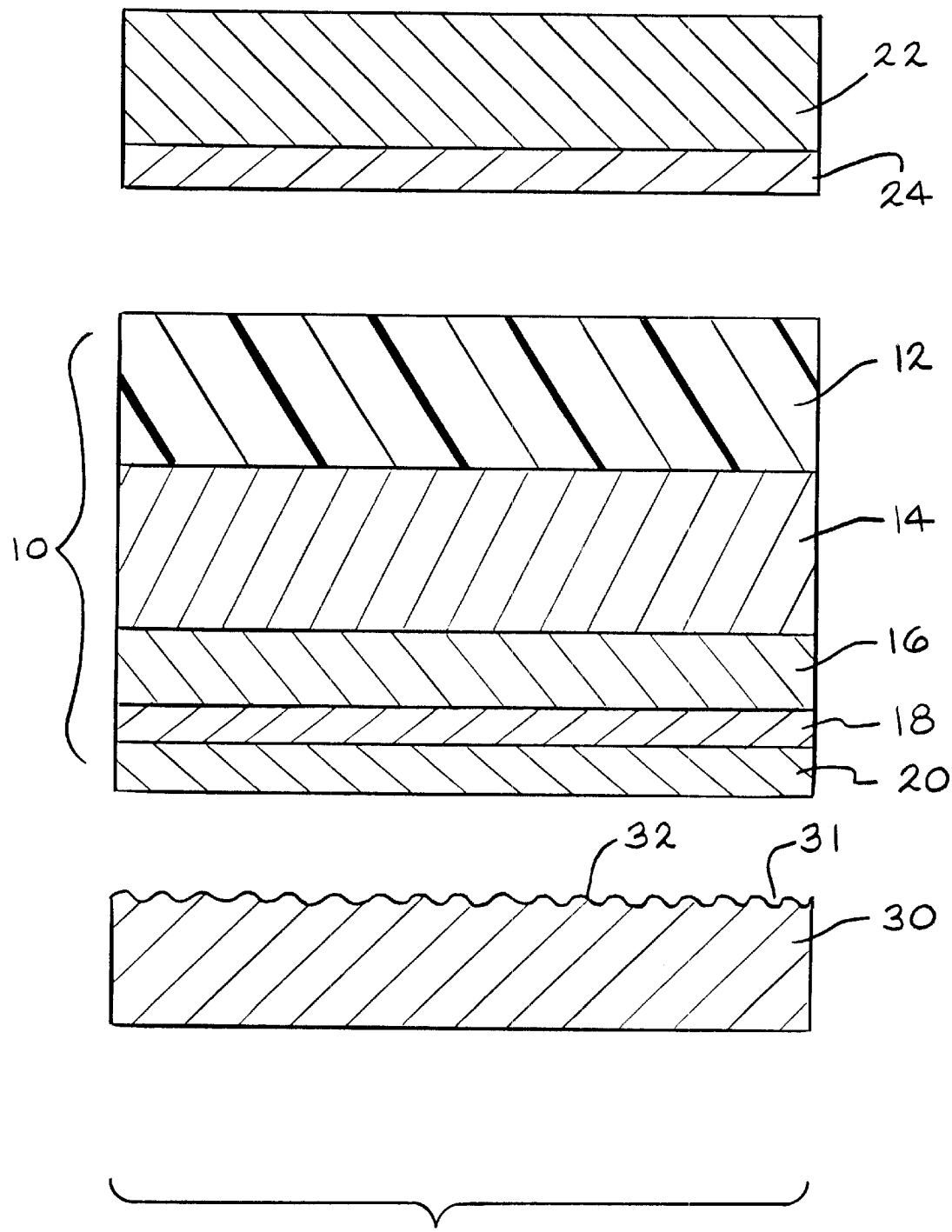
FIG. 1 is a schematic sectional view showing the composite sheet of the present invention positioned to engage a substrate spaced therefrom and showing a shim having a holographic image or diffraction grating image formed therein spaced from the opposing side of the composite sheet.
Figure 2:
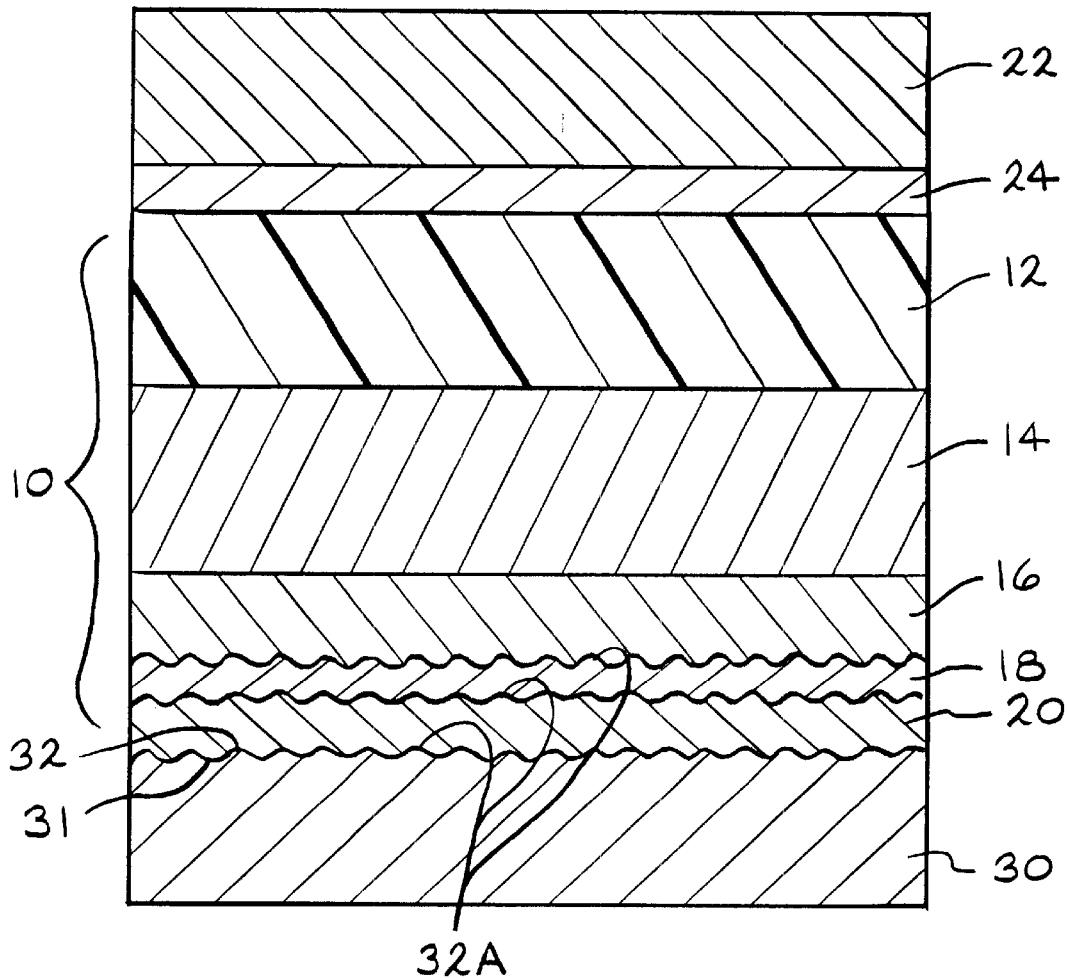
FIG. 2 is a view similar to FIG. 1 showing the shim engaged to the composite sheet forcing the composite sheet under heat and pressure into engagement with the substrate and a layer of adhesive applied to such substrate while at the same forming a holographic image or diffraction grating image into layers of wax, metal and lacquer of the composite sheet.

Referring to FIGS. 1 and 2, there is shown a composite sheet generally designated by the numeral 10. The composite sheet 10 comprises a carrier film 12 having a thickness in the preferred range of 12 microns to 125 microns and potentially as thick as 250 microns. The carrier film 12 may be formed of one of a number of different types of material including a film of polyester such as polyethylene terephthalate or a film of bi-axially oriented polypropylene, cellulose triacetate, polystyrene, polyethylene or polyvinylchloride. A first lacquer layer 14 having a thickness in the range of 0.5 to 3 microns is applied to the carrier film 12. The first layer of lacquer 14 is preferably a thermal softening lacquer applied from solution and containing acrylic and/or nitrocellulose and/or chlorinated rubber.

A second layer of lacquer 16 having a thickness in the range of 0.05 microns to 0.2 microns is applied to the first layer of lacquer 14. The second layer of lacquer may be formed of the same material as the first layer of lacquer 14.

A layer of metal 18 having a thickness in the range of 20 millimicrons to 100 millimicrons is applied to the second layer of lacquer 16. The layer of metal 18 is preferably aluminum; however, it could be stainless steel, nichrome, gold, silver, platinum or any other metal which could be vaporized and deposited by vacuum deposition or applied by sputter or electron beam deposition.

A wax coating 20 is applied over the metal layer 18. The wax coating 20 may be a microcrystalline wax or a partially saponified montan wax or, if desired, siloxane and preferably has a thickness in the range of 0.025 micron to 1 micron.

In use, the composite sheet 10 may be adhered to a substrate 22 such as paper, paperboard, fiberboard, plastic or other desired material. A layer of adhesive 24 is applied to the substrate 22 and functions to adhere the composite sheet 10 thereto. The adhesive 24 is preferably a heat activated adhesive and could be a water based adhesive, a solvent based adhesive or a hot melt adhesive.

A shim 30 having a face 31 with a holographic image or a diffraction grating image embossment 32 formed therein is positioned such that the holographic or diffraction grating image embossment 32 faces the wax layer 20 of the composite sheet 10. As schematically represented in FIG. 2, the face 31 of shim 30 and the holographic image or diffraction grating image embossment 32 is urged against the composite sheet 10 under heat and pressure to force the composite sheet 10 into engagement with the adhesive layer 24 engaged to the substrate 22. Such application under heat and pressure activates the adhesive 24 thereby causing the composite sheet 10 to become adhered to the substrate 22 while at the same time causing the holographic image or diffraction grating image embossment 32 of the shim 30 to emboss a holographic image or diffraction grating image 32A into the layer of wax 20, the layer of metal 18 and partially into the second layer of lacquer 16 to form a holographic image or diffraction grating image in the composite sheet 10 engaged to the substrate 22. The layer of wax 20 functions to prevent any particles of metal from the layer of metal 18 from reaching the face 31 or the holographic image or diffraction grating image embossment 32 formed in the face 31 of the shim 30. As will be appreciated by those skilled in the art, the transfer of metal particles from the layer of metal 18 to the holographic image or diffraction grating image embossment 32 of the shim 30 could adversely affect the quality of the holographic image or diffraction grating image embossed 32A into the composite sheet 10.

Figure 3:
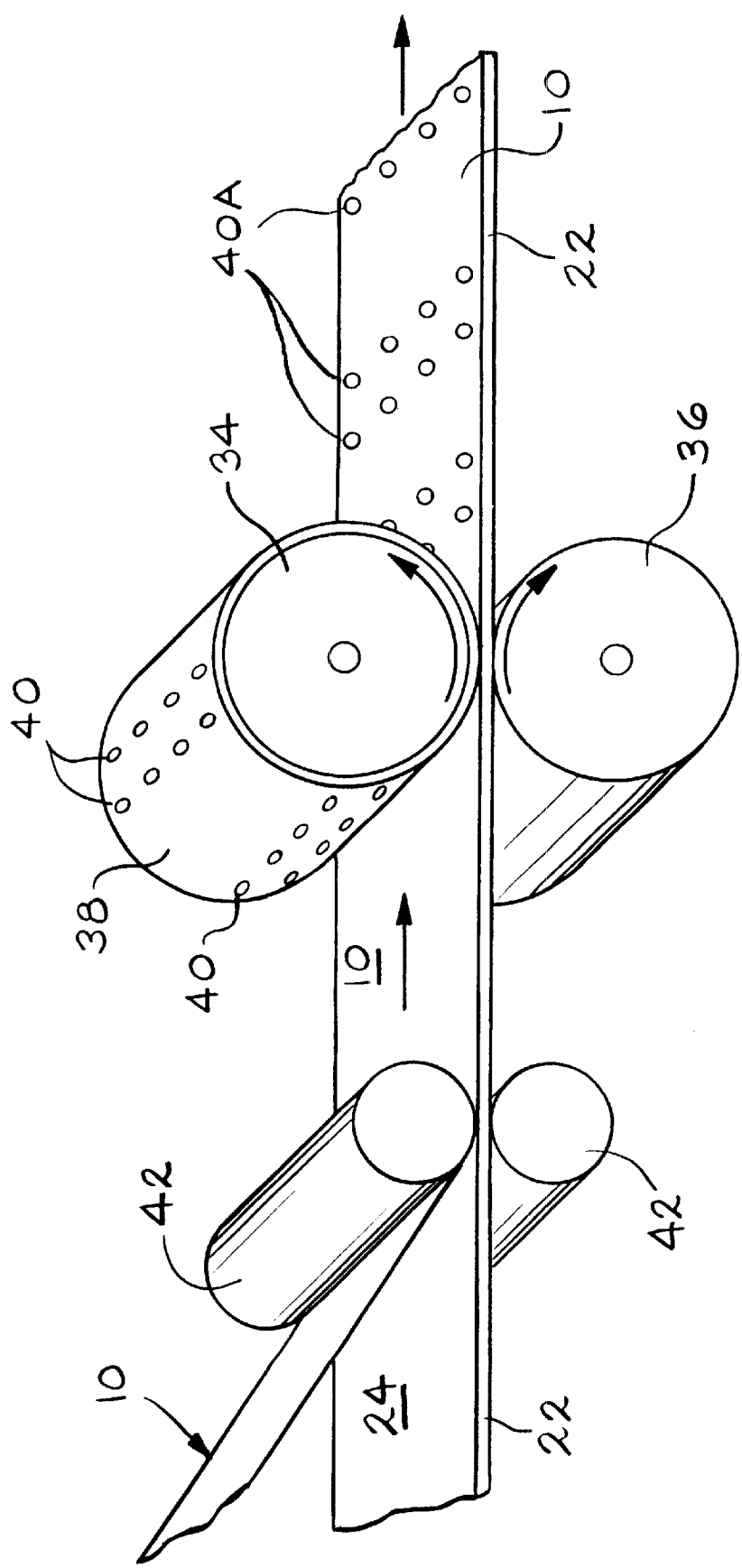
FIG. 3 is a schematic view, in perspective, showing the composite sheet and a substrate being fed between the nip of a pair of rollers, the upper one of which is heated and has a shim bearing one or more holographic images or diffraction grating images.

Referring to FIG. 3, there is shown schematically one form of apparatus for engaging the composite sheet 10 to a substrate and embossing a holographic image or diffraction grating image into the composite sheet 10. As shown in FIG. 3, there is provided a heated roller 34 and an anvil roller 36. The heated roller 34 is shown as having a shim 38 affixed circumferentially therearound. The shim 38 is shown as having a plurality of holographic image or diffraction grating image embossments 40 formed therein.

As shown in FIG. 3, a length of substrate 22 having adhesive 24 facing upwardly is fed from a source of supply, such as a supply roll, between the nip of the heated roller 34 and anvil roller 36. Composite sheet 10 is fed from a supply roll or other source of supply between a pair of idler rollers 42 where it engages the adhesive layer 24 of substrate 22. The composite sheet 10 is facing such that the carrier film 12 contacts the adhesive layer 24 and when so engaged the substrate 22 and composite sheet 10 are passed between the nip of the heated roller 34 and anvil roller 36. The heated roller 34 activates the heat activatible adhesive of the adhesive layer 24 thereby causing the composite sheet 10 to become adhered to the substrate 22. Additionally, the holographic image or diffraction grating image embossments 40 of the shim 38 emboss holographic images or diffraction grating images 40A into the layer of wax 20, layer of metal 18 and second layer of lacquer 16.

Figure 4:
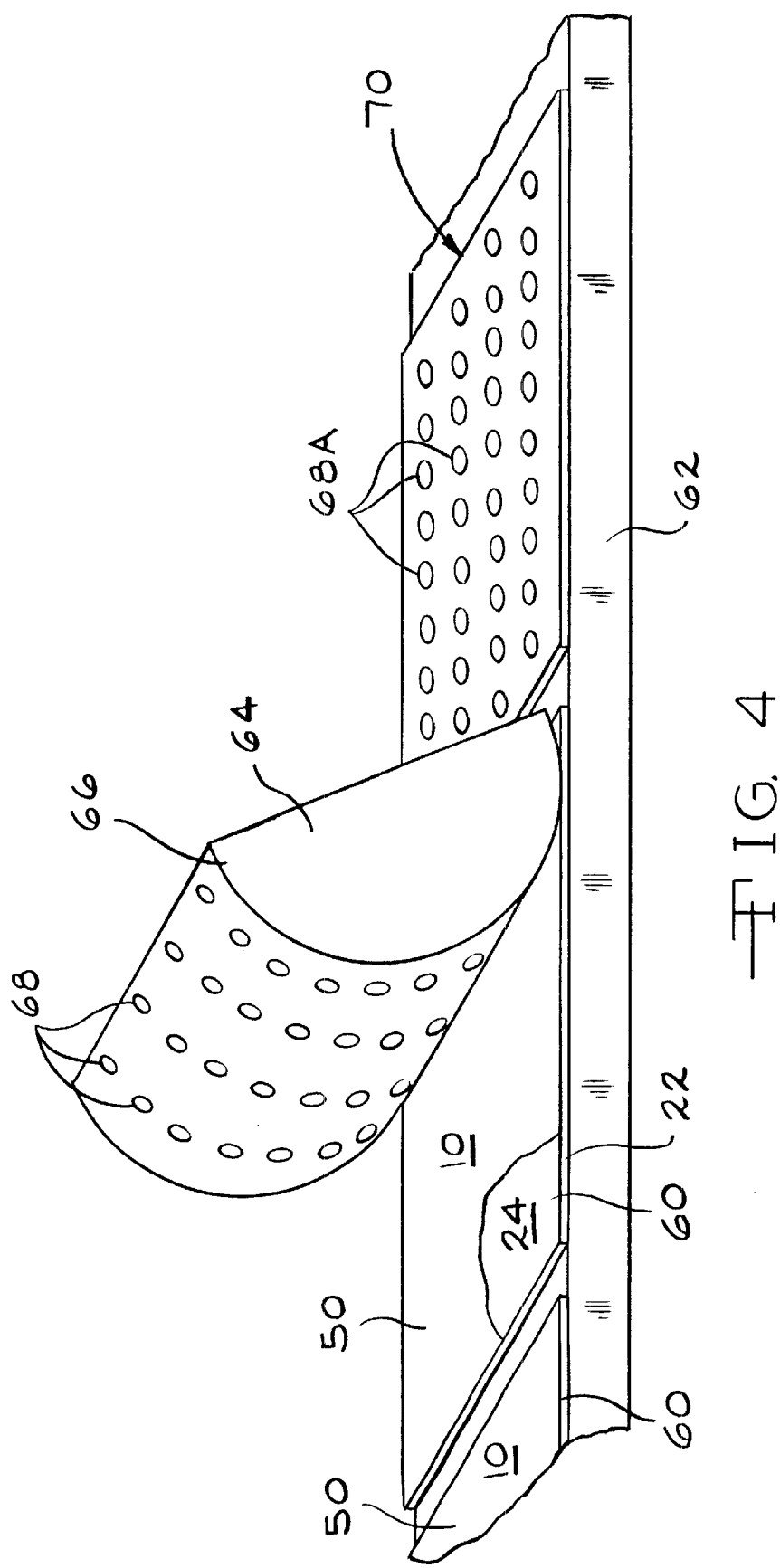
FIG. 4 is a schematic view, in perspective, showing the successive feeding of discrete sheets of (1) substrate and (2) composite sheets to a heated semi-cylindrical roller having a shim bearing one or more holographic images or diffraction grating images.

Referring to FIG. 4, there is shown schematically one form of apparatus for affixing a succession of discrete sections 50 of composite sheet material 10 to discrete sections 60 of substrate 22 coated with adhesive 24.

As shown in FIG. 4, discrete sections 60 of the adhesive coated substrate 22 with the adhesive layer 24 facing up are fed successively on a flat support member 62 to a heated semi-cylindrical roller 64 having affixed to its outer periphery a shim 66 in which has been engraved a plurality of holographic image or diffraction grating image embossments 68. Following positioning of the joined discrete section 50 of composite sheet 10 and discrete section 60 of substrate 22, the semi-cylindrical roller 64 is caused to roll throughout its semi-cylindrical extent over the surface of the discrete sheet 50. The semi-cylindrical roller 64 is heated and presses the discrete section 50 against the discrete section 60 thereby adhering such discrete section 50 to the underlying discrete section 60 of substrate 22 while at the same time causing the embossments 68 to form holographic or diffraction grating images 68A into the layer of wax 20, layer of metal 18 and second layer of lacquer 16 of the discrete section 50 of the composite sheet 10. The semi-cylindrical roller 64 may then be removed from contact with the newly embossed and joined final product 70 thereby permitting such final product 70 to be moved down-stream on the flat support member 62 and the next discrete section 60 of substrate 22 with a discrete section 50 of composite sheet 10 supported thereon be moved to a position for engagement by the semi-cylindrical roller 64.

As will be readily appreciated by those skilled in the art, a flat, heated stamping die with a shim having embossments thereon and mounted for reciprocal movement engaged to and disengaged from successive joined discrete sections 50 of composite sheet 10 and discrete sections 60 of substrate 22 may be used in place of the semi-cylindrical roller 64 for adhering the discrete sections 50 to the discrete sections 60. The stamping could be done either in-line or off-line.

The composite sheet 10 of the present invention and the method disclosed in FIGS. 3 and 4 for simultaneously applying the composite sheet to a substrate while at the same time embossing holographic images or diffraction grating images therein is very efficient as it provides a one-step operation for simultaneously accomplishing both functions of (1) adhering the composite sheet 10 to the substrate 22 and (2) embossing the holographic images or diffraction grating images 40A and 68A without the necessity of separating or transferring the composite sheet from a carrier film. It is also has the advantage that it permits the party applying the composite sheet to a substrate to maintain possession of and control over the shim bearing the holographic images or diffraction grating images thus assuring that such party's proprietary holographic images are maintained secure.

If desired, however, the composite sheet of the present invention could have the holographic images or diffraction grating images embossed thereon prior to application of the composite sheet to a substrate. In that instance, when it was desired to affix the pre-embossed composite sheet to a substrate, such pre-embossed composite sheet could be readily affixed to the desired substrate by conventional methods well known in the art such as by hot stamping or by passing the joined pre-embossed composite sheet and a substrate through the nip of a pair of smooth rollers, one of which is heated.

It is also possible to adhere the composite sheet of the present invention to a substrate and then, in a separate operation, possibly at a later time, emboss the holographic image or diffraction grating image into the composite sheet while it is affixed to the substrate.

The present composite sheet invention is particularly well suited for use in large sheets including ones as much as 60" wide. Although FIG. 3 describes the composite sheet as being supplied from a supply roll, as can be seen in FIG. 4 it can also be supplied in the form of sheets. Additionally, although FIGS. 3 and 4 shows a plurality of holographic images or diffraction grating images 40A and 68A embossed in the composite sheet 10 adhered to substrate 22, it would be possible to have a holographic image or diffraction grating image cover the entire width and length of the composite sheet adhered to the substrate.

Figure 5:
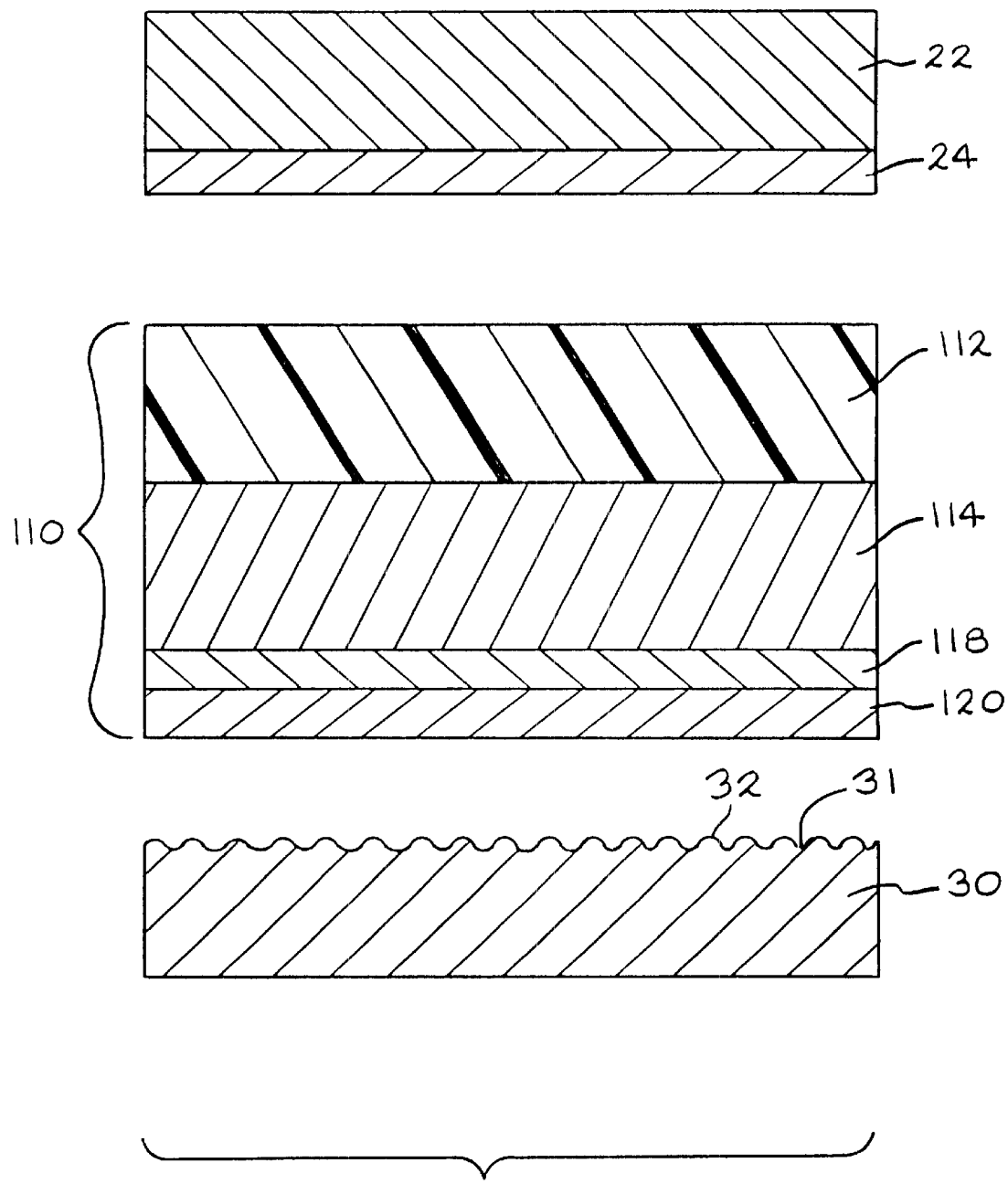
FIG. 5 is a view similar to FIG. 1 showing a modified composite sheet.
Figure 6:
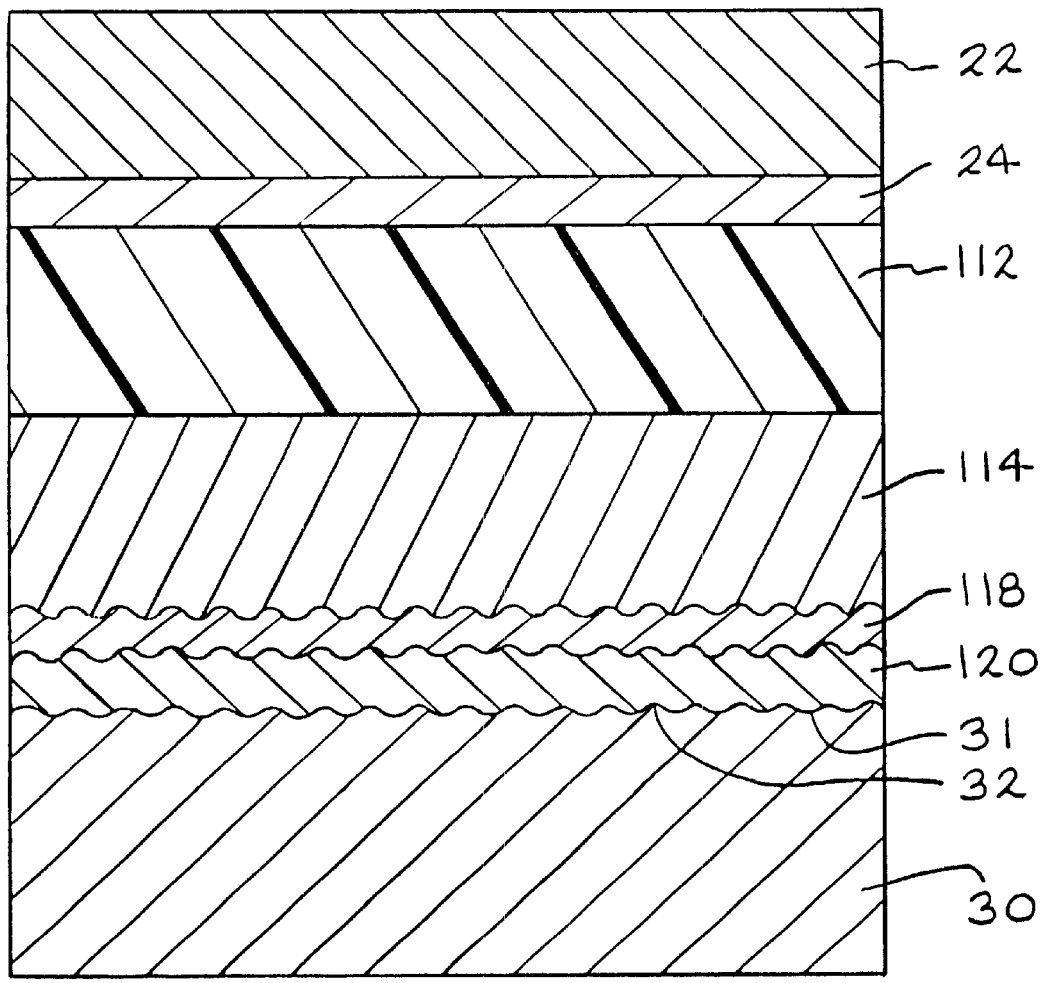
FIG. 6 is a view showing the shim engaged to the modified composite sheet.

Referring to FIGS. 5 and 6, there is shown a modified composite sheet generally designated by the numeral 110. The composite sheet 110 comprises a carrier film 112 having a thickness in the preferred range of 12 microns to 125 microns and potentially as thick as 250 microns. The carrier film 112 may be formed of one of a number of different types of material including a film of polyester such as polyethylene terephthalate or a film of bi-axially oriented polypropylene, cellulose triacetate, polystyrene, polyethylene or polyvinylchloride. A lacquer layer 114 having a thickness in the range of 0.5 to 3 microns is applied to the carrier film 112. The layer of lacquer 114 is preferably a thermal softening lacquer applied from solution and containing acrylic and/or nitrocellulose and/or chlorinated rubber.

A layer of metal 118 having a thickness in the range of 20 millimicrons to 100 millimicrons is applied to the layer of lacquer 114. The layer of metal 118 is preferably aluminum; however, it could be stainless steel, nichrome, gold, silver, platinum or any other metal which could be vaporized and deposited by vacuum deposition or applied by sputter or electron beam deposition.

A wax coating 120 is applied over the metal layer 118. The wax coating 120 may be a microcrystalline wax or a partially saponified montan wax or, if desired, siloxane and preferably has a thickness in the range of 0.025 micron to 1 micron.

In use, the modified composite sheet 110 may be adhered to a substrate 22 such as paper, paperboard, fiberboard, plastic or other desired material. A layer of adhesive 24 is applied to a substrate 22 and functions to adhere the composite sheet 110 thereto.

The shim 30 having a face 31 with a holographic image or a diffraction grating image embossment 32 formed therein is positioned such that the holographic or diffraction grating image embossment 32 faces the wax layer 120 of the composite sheet 110. As schematically represented in FIG. 6, the face 31 of the shim 30 and the holographic image or diffraction grating image embossment 32 is urged against the composite sheet 110 under heat and pressure to force the composite sheet 110 into engagement with the adhesive layer 24 engaged to the substrate 22. Such application under heat and pressure activates the adhesive 24 thereby causing the composite sheet 110 to become adhered to the substrate 22 while at the same time causing the holographic image or diffraction grating image embossment 32 of the shim 30 to emboss a holographic image or diffraction grating image into the layer of wax 120, the layer of metal 118 and partially into the layer of lacquer 114 to form a holographic image or diffraction grating image in the composite sheet 110 engaged to the substrate 22.

Other modifications will become readily apparent to those skilled in the art.

I claim:

1. A method for making an article comprising the steps of:
   (a) providing a composite sheet having the capability of receiving embossed therein a holographic image or diffraction grating image, said composite sheet including:
      (i) a plastic film carrier layer,
      (ii) a layer of lacquer,
      (iii) a layer of metal,
      (iv) a layer of wax or siloxane,
   (b) providing a substrate having a layer of adhesive;
   (c) feeding said substrate and said composite sheet to a heating and pressurizing station with said layer of adhesive facing said plastic film carrier layer, said station having a pair of surfaces, at least one of which is heated and one of said pair of surfaces has a holographic image embossment or diffraction grating image embossment thereon; and
   (d) subjecting said substrate and said composite sheet to pressure from said surfaces and heat from at least one of said surfaces to adhere said composite sheet to said substrate and to press said embossment against said layer of wax or siloxane during step (d).

2. The method according to claim 1 wherein said embossment forms a holographic image or diffraction grating image into said layer of wax or siloxane, said layer of metal and at least partially into said layer of lacquer.

3. The method according to claim 1 wherein said heating and pressurizing station comprise a unit carrying said embossment, said embossment defining a portion of a cylinder and further including the step of causing said unit to alternately rotate in one direction and then in an opposing direction, step (d) occurring during rotation in one of said directions while simultaneously embossing a holographic image or diffraction image in said composite sheet.

4. A method according to claim 1 wherein said heating and pressurizing station comprises a reciprocating die having said surface with said embossment thereon and further including the step of positioning a section of substrate and a section of composite sheet in a location aligned with said reciprocating die and further including the step of moving said die into engagement with said composite sheet section, disengaging said die from composite sheet section and removing said article from alignment with said reciprocating die.

5. A method for making an article comprising the steps of:
   (a) providing a composite sheet having the capability of receiving embossed therein a holographic image or diffraction grating image, said composite sheet including:
      (i) a plastic film carrier layer,
      (ii) a first layer of lacquer,
      (iii) a second layer of lacquer,
      (iv) a layer of metal,
      (v) a layer of wax or siloxane,
   (b) providing a substrate having a layer of adhesive;
   (c) feeding said substrate and said composite sheet to a heating and pressurizing station with said layer of adhesive facing said plastic film carrier layer, said station having a pair of surfaces, at least one of which is heated and one of said pair of surfaces has a holographic image embossment or diffraction grating image embossment thereon; and
   (d) subjecting said substrate and said composite sheet to pressure from said surfaces and heat from at least one of said surfaces to adhere said composite sheet to said substrate and to press said embossment against said layer of wax or siloxane during step (d).

6. The method according to claim 5 wherein said embossment forms a holographic image or diffraction grating image into said layer of wax or siloxane, said layer of metal and at least partially into said second layer of lacquer.

7. The method according to claim 5 wherein said heating and pressurizing station comprises a unit carrying said embossment, said embossment defining a portion of a cylinder and further including the step of causing said unit to alternately rotate in one direction and then in an opposing direction, step (d) occurring during rotation in one of said directions while simultaneously embossing a holographic image or diffraction image in said composite sheet.

8. A method according to claim 5 wherein said heating and pressurizing station comprises a reciprocating die having said surface with said embossment thereon and further including the step of positioning a section of substrate and a section of composite sheet in a location aligned with said reciprocating die and further including the step of moving said die into engagement with said composite sheet section, disengaging said die from composite sheet section and removing said article from alignment with said reciprocating die.

9. A method for making an article having a holographic image or diffraction grating image comprising the steps of:
   (a) providing a composite sheet having:
      (i) a plastic film carrier layer,
      (ii) a layer of lacquer,
      (iii) a layer of metal,
      (iv) a layer of wax or siloxane,
   (b) providing a substrate having a layer of adhesive;
   (c) providing a heating and pressurizing station with a pair of surfaces moveable relative to one another, at least one of said surfaces being heated and at least one of said surfaces having an embossment defining a holographic image or diffraction grating image;
   (d) feeding said substrate and said composite sheet between said pair of surfaces with said layer of adhesive facing said plastic film carrier layer and said layer of wax or siloxane facing said embossment; and
   (e) subjecting said substrate and said composite sheet to pressure from said surfaces and heat from said heated surface to adhere said composite sheet to said substrate while simultaneously embossing a holographic image or diffraction grating image into said layer of wax or siloxane, said layer of metal and at least partially into said layer of lacquer.

10. The method according to claim 9 wherein said heating and pressurizing station comprises first and second continuously rotating rollers, each of which has one of said surfaces and further including the step of continuously feeding said substrate and said composite sheet to said rollers.

11. The method according to claim 9 wherein said heating and pressurizing station comprises a unit carrying said embossment, said embossment defining a portion of a cylinder and further including the step of causing said unit to alternately rotate in one direction and then in an opposing direction, step (e) occurring during rotation in one of said directions while simultaneously embossing a holographic image or diffraction image in said composite sheet.

12. A method according to claim 9 wherein said heating and pressurizing station comprises a reciprocating die having said surface with said embossment thereon and further including the step of positioning a section of substrate and a section of composite sheet in a location aligned with said reciprocating die and further including the step of moving said die into engagement with said composite sheet section, disengaging said die from composite sheet section and removing said article from alignment with said reciprocating die.

13. A method for making an article having a holographic image or diffraction grating image comprising the steps of:
   (a) providing a composite sheet having:
      (i) a plastic film carrier layer,
      (ii) a first layer of lacquer,
      (iii) a second layer of lacquer,
      (iv) a layer of metal,
      (v) a layer of wax or siloxane,
   (b) providing a substrate having a layer of adhesive;
   (c) providing a heating and pressurizing station with a pair of surfaces moveable relative to one another, at least one of said surfaces being heated and at least one of said surfaces having an embossment defining a holographic image or diffraction grating image;
   (d) feeding said substrate and said composite sheet between said pair of surfaces with said layer of adhesive facing said plastic film carrier layer and said layer of wax or siloxane facing said embossment; and
   (e) subjecting said substrate and said composite sheet to pressure from said surfaces and heat from said heated surface to adhere said composite sheet to said substrate while simultaneously embossing a holographic image or diffraction grating image into said layer of wax or siloxane, said layer of metal and at least partially into said second layer of lacquer.

14. The method according to claim 13 wherein said heating and pressurizing station comprises first and second continuously rotating rollers, each of which has one of said surfaces and further including the step of continuously feeding said substrate and said composite sheet to said rollers.

15. The method according to claim 13 wherein said heating and pressurizing station comprises a unit carrying said embossment, said embossment defining a portion of a cylinder and further including the step of causing said unit to alternately rotate in one direction and then in an opposing direction, step (e) occurring during rotation in one of said directions while simultaneously embossing a holographic image or diffraction image in said composite sheet.

16. A method according to claim 13 wherein said heating and pressurizing station comprises a reciprocating die having said surface with said embossment thereon and further including the step of positioning a section of substrate and a section of composite sheet in a location aligned with said reciprocating die and further including the step of moving said die into engagement with said composite sheet section, disengaging said die from composite sheet section and removing said article from alignment with said reciprocating die.

\* \* \* \* \*